United States Patent
Lee

(10) Patent No.: US 8,529,227 B2
(45) Date of Patent: Sep. 10, 2013

(54) SUBMERSIBLE PUMP CAPABLE OF PROVIDING LOW VOLTAGE POWER SUPPLY

(75) Inventor: Ming Yu Lee, Keelung (TW)

(73) Assignee: Shining Pond Electronic Product Inc., Shenzhen (CN)

( * ) Notice: Subject to any disclaimer, the term of this patent is extended or adjusted under 35 U.S.C. 154(b) by 974 days.

(21) Appl. No.: 12/254,657

(22) Filed: Oct. 20, 2008

(65) Prior Publication Data
US 2009/0226335 A1   Sep. 10, 2009

(30) Foreign Application Priority Data
Oct. 22, 2007   (CN) .................. 2007 2 0172607 U

(51) Int. Cl.
F04B 35/04   (2006.01)
(52) U.S. Cl.
USPC .................................. 417/423.3; 417/423.7
(58) Field of Classification Search
USPC .......................................... 417/423.3, 423.7
See application file for complete search history.

(56) References Cited

U.S. PATENT DOCUMENTS

| | | | |
|---|---|---|---|
| 6,479,915 B2 * | 11/2002 | Hsueh | 310/87 |
| 6,765,325 B1 * | 7/2004 | Prouvost | 310/87 |
| 2003/0197441 A1 * | 10/2003 | Lolato | 310/113 |
| 2004/0018104 A1 * | 1/2004 | Watkins | 417/423.3 |

* cited by examiner

Primary Examiner — Nimeshkumar Patel
Assistant Examiner — Jacob R Stern
(74) Attorney, Agent, or Firm — Jackson IPG PLLC

(57) ABSTRACT

A submersible pump capable of providing low voltage power supply comprises a pump body and a filter cover connected to the pump body; a stator containing cavity and a rotor containing cavity is provided in the pump body; the outside of the rotor containing cavity is provided with an impeller room, and the upside of the impeller room is provided with a water outlet; a silicon steel sheet group of a stator and a stator coil are encapsulated in the stator containing cavity in the pump body; a permanent magnet rotor is fixed in the rotor containing cavity in the pump body via a rotor shaft; an impeller at one end of the permanent magnet rotor is located in the impeller room; it also comprises an internal transformer; the internal transformer is provided with a low voltage coil, and the stator coil acting as a high voltage coil, and the two coils are located at the silicon steel sheet group of the stator; the low voltage coil provides AC low voltage power supply to the outside. An internal transformer is constitute by the original silicon steel sheet group of the stator, the original stator coil, and an appended low voltage coil; this design occupies small room, and can provide AC or DC low voltage power supply to the outside as the submersible pump is working, so it is safe to use, and works reliably.

13 Claims, 4 Drawing Sheets

SUBMERSIBLE PUMP CAPABLE OF PROVIDING LOW VOLTAGE POWER SUPPLY

FIELD OF THE INVENTION

The present invention involves techniques of submersible pumps, particularly involves a submersible pump capable of providing low voltage power supply.

BACKGROUND OF THE INVENTION

Outdoor fountains in market, such as poly resin fountains, ceramic fountains, and pond fountains, which adopt submersible pumps, generally require adscititious LED lights or products using low voltage power supply. At present, most use an adscititious transformer to transform and supply the power, but the adscititious transformer increases the cost very much, and while being used, an additional attaching plug is required, which will cause a lot of trouble and inconvenience to the consumers. Some use capacitors to reduce the voltage, but using capacitors to reduce the voltage will not implement isolating high voltage and low voltage, which will easily lead to safety accidents of electric leakage and electric shock, so, it is extremely unsafe, and the current provided by using capacitors to reduce the voltage is very small, which will not meet the requirements of more loads.

The technical solution that a submersible pump can directly provide AC or DC low voltage power supply to the outside as the submersible pump is working at present is not disclosed by relevant literatures.

SUMMARY OF THE INVENTION

To avoid the existing disadvantages of conventional art, the present invention provides a submersible pump capable of providing low voltage power supply, which utilizes the silicon steel sheet group of the stator, the stator coil, and a low voltage coil to constitute an internal transformer, so as to being able to provide AC or DC low voltage power supply to the outside as the submersible pump is working.

The present invention provides a submersible pump capable of providing low voltage power supply, which comprises a pump body and a filter cover connected to the pump body; a stator containing cavity and a rotor containing cavity are provided in the pump body; the outside of the rotor containing cavity is provided with an impeller room, and the upside of the impeller room is provided with a water outlet; a silicon steel sheet group of a stator and a stator coil are encapsulated in the stator containing cavity in the pump body; a permanent magnet rotor is fixed in the rotor containing cavity in the pump body via a rotor shaft; an impeller at one end of the permanent magnet rotor is located in the impeller room; it also comprises an internal transformer; the internal transformer is provided with a low voltage coil, and the stator coil acting as a high voltage coil, and the two coils are located at the silicon steel sheet group of the stator; the low voltage coil of the internal transformer provides AC low voltage power supply to the outside.

According to the requirements, a circuit board can be encapsulated in the stator containing cavity of the pump body, and the circuit board is provided with a rectifier filter circuit, or a rectifier filter circuit and voltage regulator circuit, to constitute a DC low voltage power supply, so as to provide DC low voltage power supply to the outside, for the external DC products, or LED lights, etc. to use.

On the circuit board, the output terminal of the rectifier filter circuit or the voltage regulator circuit can be connected to a control circuit, so as to implement controlling the external DC products, such as LED color-changing lights.

The present invention further comprises a waterproof male female connector assembly, and the waterproof male female connector assembly is connected to the output terminal of the DC or AC low voltage power supply in the submersible pump.

The present invention utilizes the original silicon steel sheet group and stator coil in a submersible pump, together with an appended low voltage coil to constitute an internal transformer; this design occupies small room, and can provide AC or DC low voltage power supply to the outside as the submersible pump is working, so it is safe to use, and works reliably.

This design can easily implement designing a PCB board inside the pump, which can integrate the rectifier, filter, voltage regulator, or other control circuit module into the PCB board, and then one or multiple low voltage power supplies can be drawn out to be provided to color-changing LEDs or illuminations, or other AC or DC products needing low voltage power supply.

DESCRIPTION OF THE PREFERRED EMBODIMENT

Aspects of the present invention are best understood from the following detailed description when read with reference to the accompanying figures.

Figure 1:
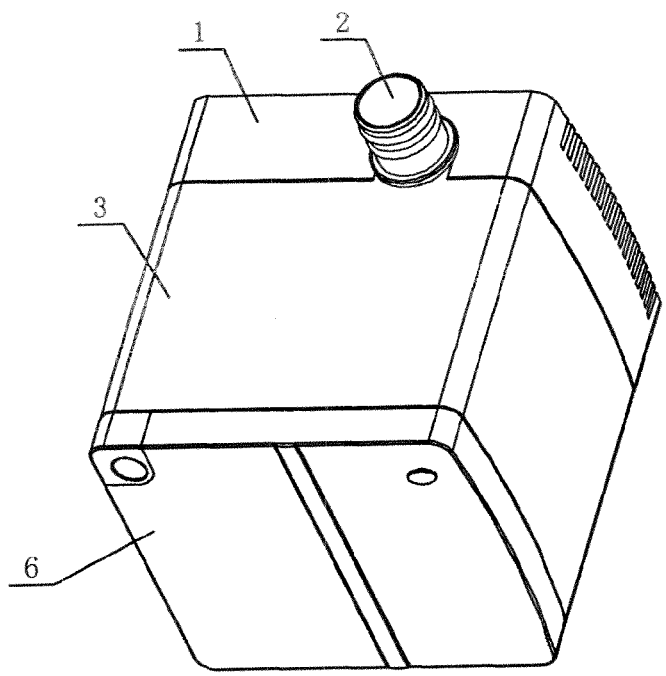
FIG. 1 is a structure schematic diagram of the embodiment 1 of the present invention.
Figure 2:
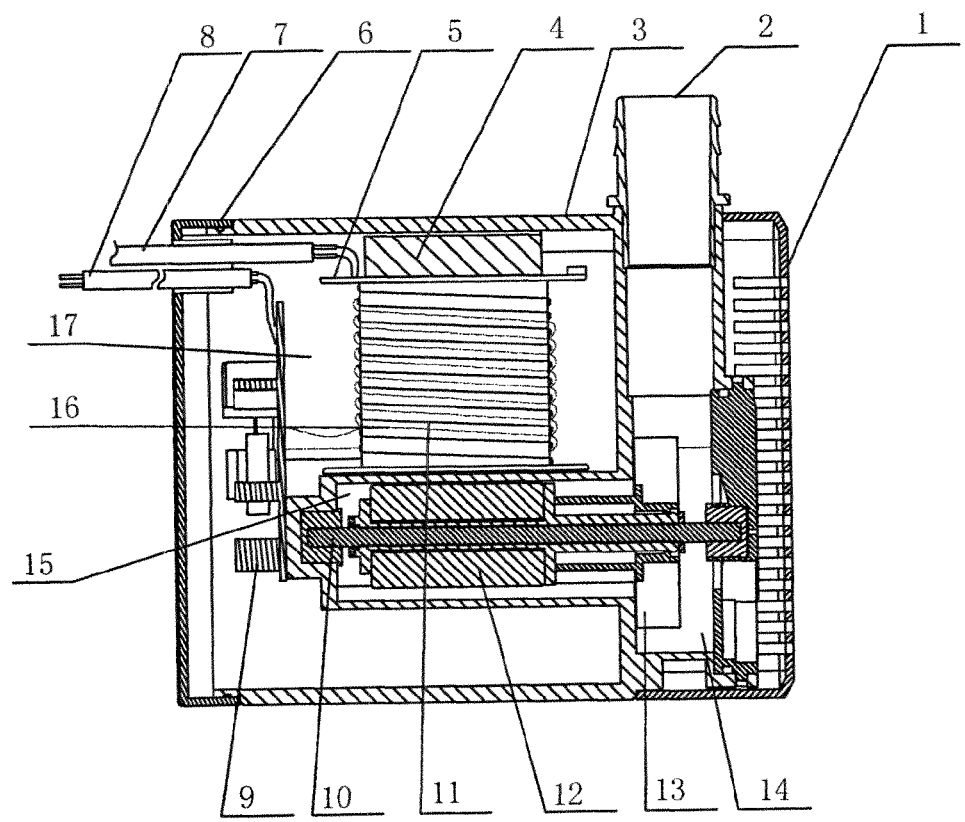
FIG. 2 is an internal structure schematic diagram of FIG. 1.

Referring to FIG. 1 and FIG. 2, the submersible pump of the embodiment 1 comprises a pump body 3 and a filter cover 1 connected to the pump body 3; a stator containing cavity 17 and a rotor containing cavity 15 are provided in the pump body 3; the outside of the rotor containing cavity 15 is provided with an impeller room 14, and the upside of the impeller room 14 is provided with a water outlet 2; the silicon steel sheet group 4 of the stator and the stator coil 11 winded around the framework 5 are encapsulated in the stator containing cavity 17 in the pump body 3 by binders such as epoxy resin; the permanent magnet rotor 12 is fixed in the rotor containing cavity 15 in the pump body 3 via a rotor shaft 10, and the impeller 13 at one end of the permanent magnet rotor 12 is located in the impeller room 14

It also comprises an internal transformer; the internal transformer comprises a low voltage coil 16, and the stator coil 11 acting as a high voltage coil, and the two coils are located at the silicon steel sheet group 4 of the stator; the low voltage coil 16 of the internal transformer can provide AC low voltage power supply to the outside.

Figure 4:
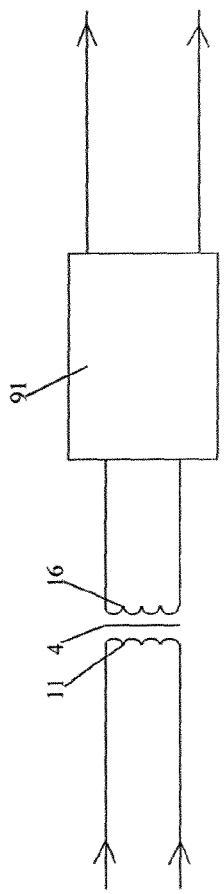
FIG. 4 is a schematic diagram of the internal transformer and the circuit board part.

Referring to FIG. 2 and FIG. 4, a circuit board 9 is encapsulated in the stator containing cavity 17 of the pump body 3, and the circuit board 9 is provided with a rectifier filter circuit, or a rectifier filter circuit and voltage regulator circuit 91; the internal transformer transforms the input of 100-240 Vac into 0.5-30 Vac, and then it is input to the rectifier filter circuit to constitute a DC low voltage power supply, so as to provide DC low voltage power supply to the outside; wherein, 7 represents the AC high voltage input power cord, and 8 represents the DC low voltage output power cord, which are led out from the via hole of the back cap 6 at the back end of the pump body 3.

The output terminal of the rectifier filter circuit or the voltage regulator circuit 91 of the circuit board 9 can be connected to a control circuit, to provide the output of control signals of other functions, so as to implement controlling the external loads such as LEDs.

When the load needs AC power supply, the AC low voltage of 0.5-30 Vac can be directly led out from the low voltage side of the internal transformer or via the circuit board.

The structure of the internal transformer can be as shown in from FIG. 3*a* to FIG. 3*d*. Wherein, the silicon steel sheet group 4 of the stator, the stator coil 11, and a low voltage coil 16 constitute an internal transformer, and 12 represents the permanent magnet rotor.

Figure 3:
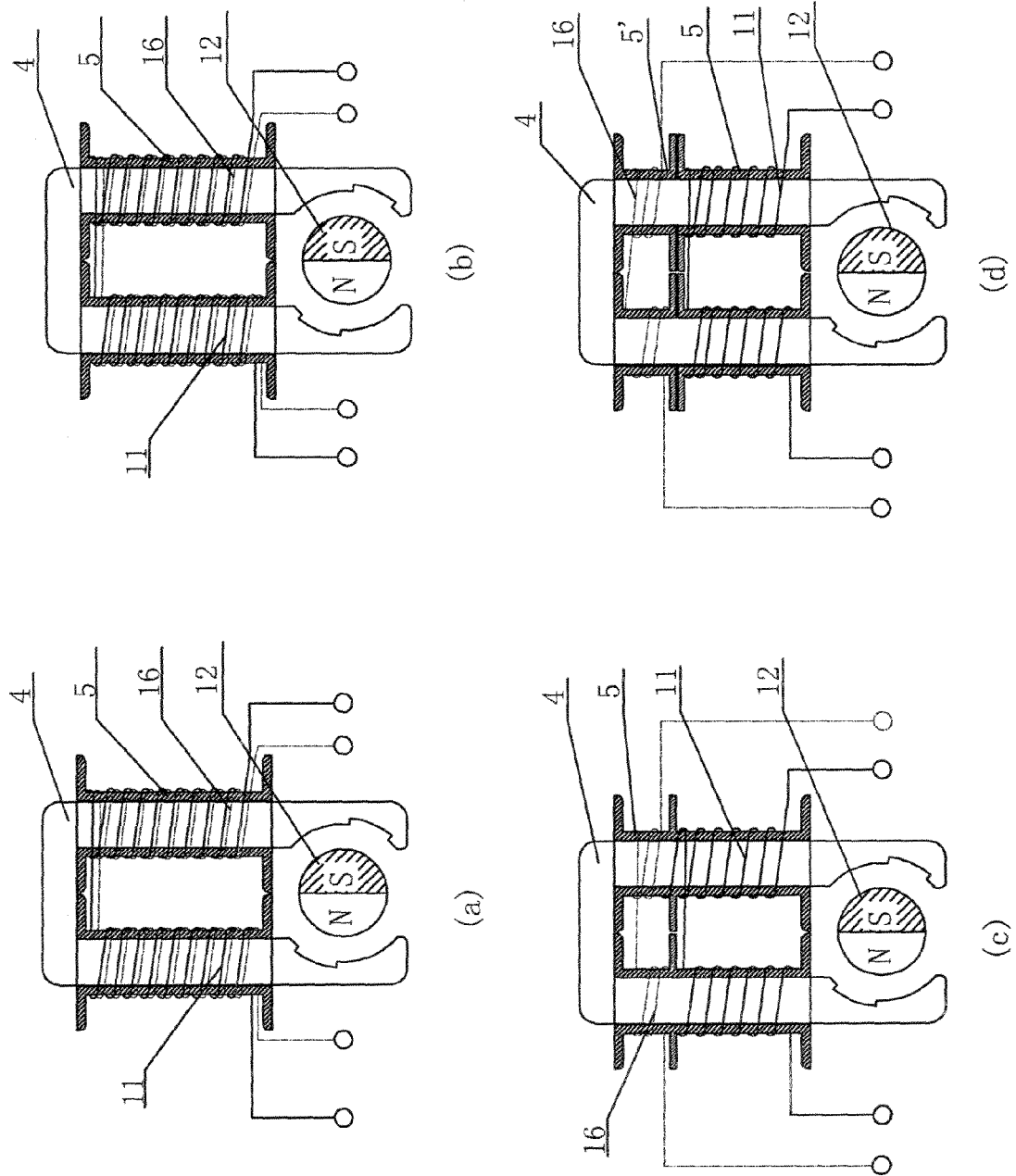
FIG. 3a to FIG. 3d are structure schematic diagrams of the internal transformer.

Referring to FIG. 3*a*, the silicon steel sheet group 4 of the stator, the stator coil 11 winded around the framework 5, and a low voltage coil 16 constitute an internal transformer. The low voltage coil 16 of the internal transformer is winded around the framework 5 of the stator coil 11; the low voltage coil 16 is winded below, and the stator coil 11 is winded above the low voltage coil 16.

Also as seen in FIG. 3*b*, the low voltage coil 16 of the internal transformer is winded around the framework 5 of the stator coil 11; the stator coil 11 is winded below, and the low voltage coil 16 is winded above the stator coil 11.

Referring to FIG. 3*c*, the low voltage coil 16 and the stator coil 11 of the internal transformer can adopt the same framework 5, and the framework 5 is provided with low voltage winding grooves and high voltage winding grooves; the low voltage coil 16 and the stator coil 11 are separately winded in the low voltage winding grooves and the high voltage winding grooves of the framework 5.

Referring to FIG. 3*d*, the stator coil 11 and the low voltage coil 16 of the internal transformer can also be separately winded around different frameworks; the low voltage coil 16 is winded around the low voltage framework 5', and the low voltage coil 16 is close to the transverse connecting piece of the silicon steel sheet group 4; the stator coil 11 is still winded around its framework 5.

The design, coil turn number, and winding method of the stator coil 11 are equated with traditional designs. The turn number of the low voltage coil 16 can be designed according to the requirement of the desired low voltage power supply. The AC voltage output by the internal transformer of the embodiment 1 can be 0.5-30 Vac.

Principle statement: when high voltage alternating current is input into the submersible pump, wherein, the stator coil fixed to the silicon steel sheet group produces an alternating magnetic field, and the magnetic field drives the permanent magnet rotor to rotate; the permanent magnet rotor drives the impeller to rotate together, and the liquid is output from the water outlet above the impeller room by the function of the rotation centrifugal force of the impeller. Meanwhile, the silicon steel sheet group, the stator coil, and the low voltage coil constitute an internal transformer to provide AC or DC low voltage power supply to the outside, which is provided to color-changing LEDs, illuminations, or other AC or DC products needing low voltage power supply.

Figure 5:
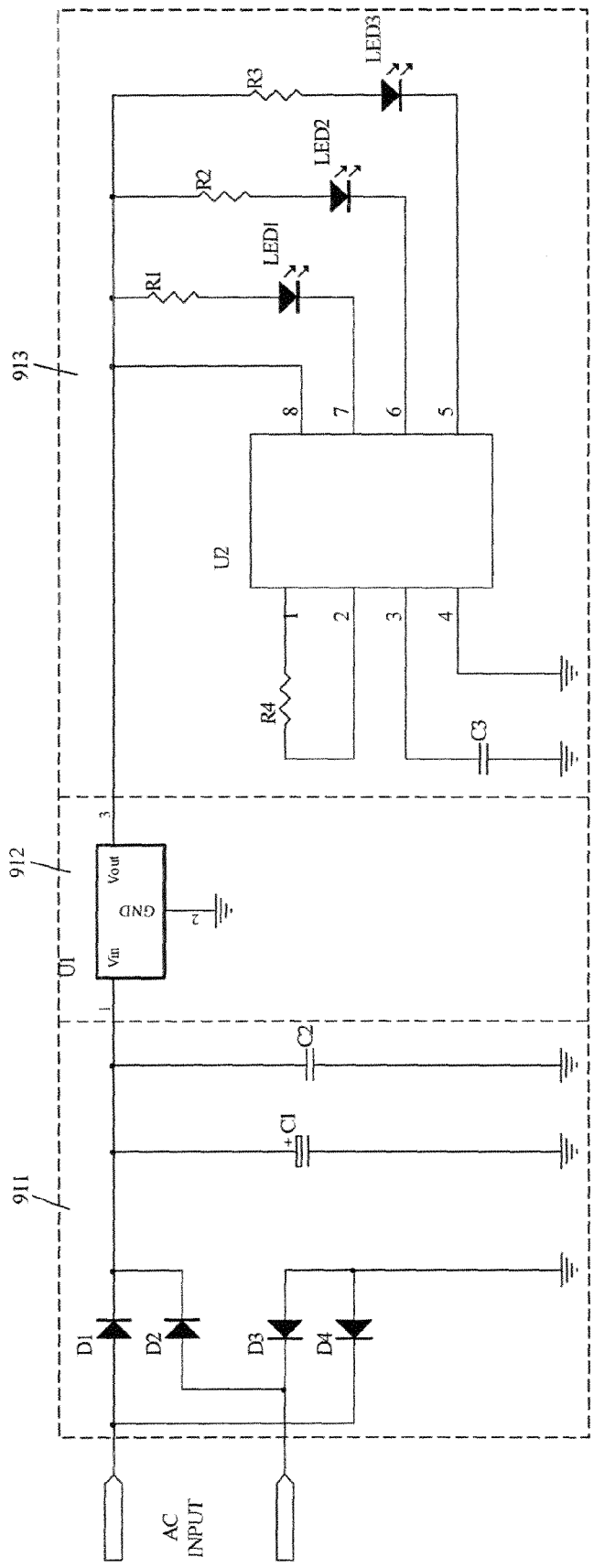
FIG. 5 is one of the implementary circuit diagrams, which comprises a rectifier filter circuit, a voltage regulator circuit, and a control circuit, etc.

FIG. 5 is one of the implementary circuit diagrams, which comprises a rectifier filter circuit 911, a voltage regulator circuit 912, and a control circuit part 913, etc. The voltage of 0.5-30 Vac at the low voltage side of the internal transformer is connected to the input of the rectifier filter circuit 911; the output of the rectifier filter circuit 911 is connected to the voltage regulator circuit 912; the output of the voltage regulator circuit 912 acts as the working voltage of the control circuit part 913.

The rectifier filter circuit 911 can adopt general rectifier bridges and filter capacitors to constitute; the voltage regulator circuit 912 can adopt integrated three terminal regulators, etc.; the control circuit part 913 can be chosen and designed according to the characteristic of the controlled external loads; as shown in FIG. 5, U2 represents a control drive circuit to control and drive the three light emitting diodes LED1, LED2, and LED3 that are connected to its output terminal to alternatively flicker; wherein, R1-R3 represent current-limiting resistors corresponding to the three light emitting diodes; R4 represents an external oscillation resistor connected to U2; C3 represents an external filter capacitor connected to U2.

Figure 6:
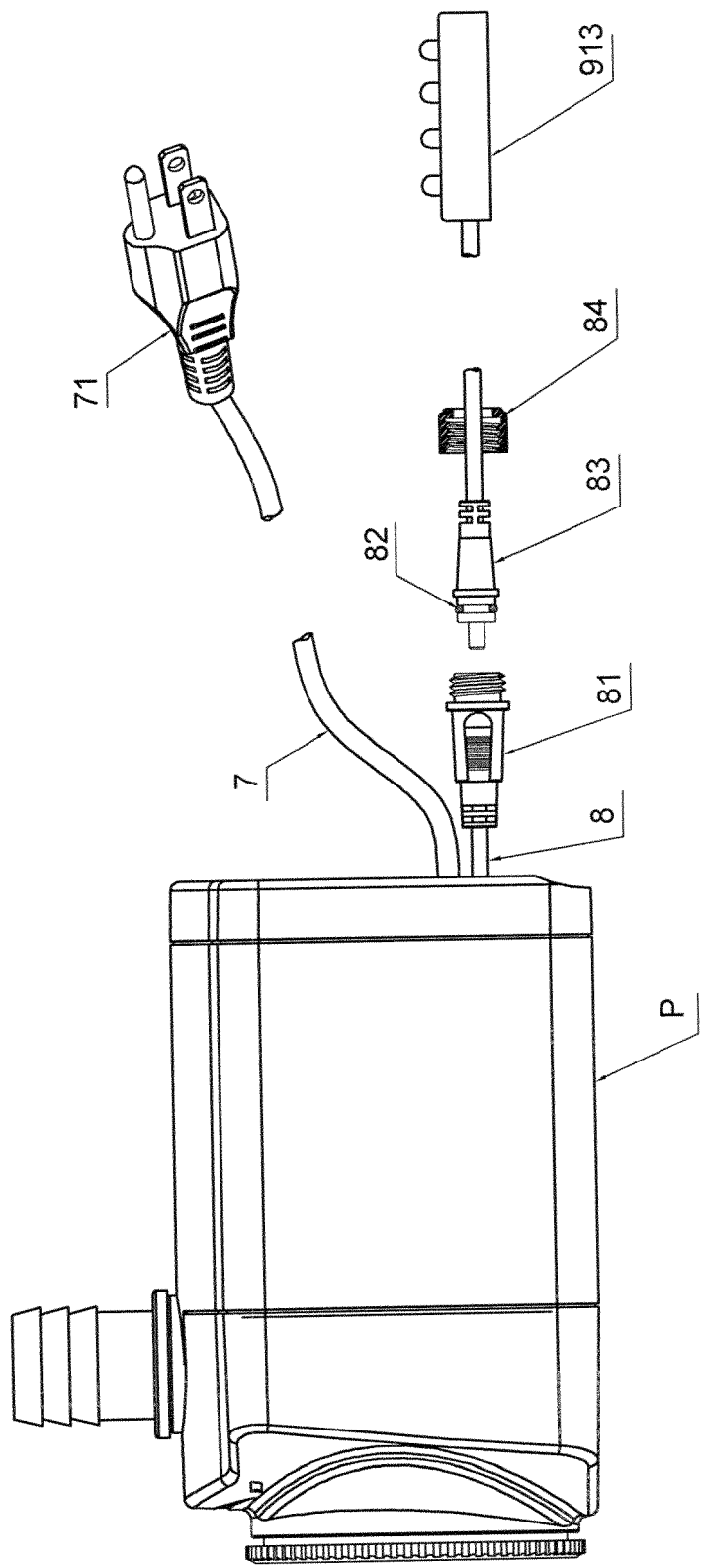
FIG. 6 is a schematic diagram of the embodiment 2 of the present invention.

FIG. 6 is a schematic diagram of the embodiment 2. The internal structure of the submersible pump of the embodiment 2 is the same with the submersible pump of the embodiment 1, and will be no more described. Referring to FIG. 6 and FIG. 5, the submersible pump P of the embodiment 2 also comprises a waterproof male female connector assembly, and the waterproof male female connector assembly is connected to the output terminal of the DC low voltage power supply in the submersible pump P (in FIG. 6, it is connected to the output terminal of the DC low voltage power supply via the DC low voltage output power cord 8), so as to provide DC low voltage power supply to the control circuit part 913, etc. that are connected to the outside. The waterproof male female connector assembly comprises a waterproof female socket 81, a waterproof male plug 83 with a sealant rubber ring 82, and a locknut 84; the waterproof female socket 81 and the waterproof male plug 83 are locked via the locknut 84; one end of the waterproof male plug 83 is connected to the control circuit part 913; the AC high voltage input power cord 7 is connected to the AC high voltage power supply via the AC attaching plug 71.

When the load needs AC power supply, the AC low voltage power supply can be directly provided by the low voltage side of the internal transformer of the submersible pump P or by the circuit board.

For the convenience of being fixed, the submersible pump P can be provided with a waterproof male female connector assembly; the waterproof male female connector assembly is connected to the output terminal of the AC low voltage power supply in the submersible pump P (that is, the low voltage output terminal of the internal transformer), so as to provide AC low voltage power supply to the external AC loads.

What is claimed is:

1. A submersible pump capable of providing low voltage power supply comprising:
   a pump body and a filter cover connected to the pump body;
   a stator containing cavity and a rotor containing cavity being provided in the pump body, an outside of the rotor containing cavity provided with an impeller room, the upside of the impeller room provided with a water outlet;
   a silicon steel sheet group of a stator and a stator coil encapsulated in the stator containing cavity in the pump body;
   a permanent magnet rotor fixed in the rotor containing cavity in the pump body via a rotor shaft;

an impeller at one end of the permanent magnet rotor located in the impeller room;

an internal transformer; wherein the internal transformer is configured to receive a high voltage AC supply and is provided with a low voltage coil, and the stator coil acts as a high voltage coil of the internal transformer, and the low voltage and high voltage coils are both located at the silicon steel sheet group of the stator and wherein the low voltage coil of the internal transformer is wound around a framework of the stator coil such the low voltage coil is wound below and the stator coil is wound above the low voltage coil, or alternatively wherein the stator coil is wound below and the low voltage coil is wound above the stator coil and further comprising a rectifier filter circuit connected to the low voltage coil such that the low voltage coil of the internal transformer provides AC low voltage to the rectifier filter circuit and the rectifier filter circuit provides low voltage DC power supply to the outside.

2. The submersible pump capable of providing low voltage power supply of claim 1, characterized in that the AC voltage output by the internal transformer is 0.5-30Vac.

3. The submersible pump capable of providing low voltage power supply of claim 1, characterized in that a circuit board is encapsulated in the stator containing cavity of the pump body, and the circuit board is provided with the rectifier filter circuit, or the rectifier filter circuit and a voltage regulator circuit, so as to constitute the DC low voltage power supply.

4. The submersible pump capable of providing low voltage power supply of claim 3, characterized in that the output terminal of the rectifier filter circuit or the voltage regulator circuit of the circuit board is connected to a control circuit, so as to implement controlling the external loads.

5. The submersible pump capable of providing low voltage power supply of claim 3, characterized in that it further comprises a waterproof male female connector assembly, and the waterproof male female connector assembly is connected to the output terminal of the DC low voltage power supply in the submersible pump.

6. A submersible pump capable of providing low voltage power supply comprising:
   a pump body and a filter cover connected to the pump body;
   a stator containing cavity and a rotor containing cavity provided in the pump body, an outside of the rotor containing cavity provided with an impeller room, the upside of the impeller room provided with a water outlet;
   a silicon steel sheet group of a stator and a stator coil encapsulated in the stator containing cavity in the pump body;
   a permanent magnet rotor fixed in the rotor containing cavity in the pump body via a rotor shaft, an impeller at one end of the permanent magnet rotor located in the impeller room;
   an internal transformer; wherein the internal transformer is configured to receive a high voltage AC supply and is provided with a low voltage coil, and the stator coil acts as a high voltage coil of the internal transformer, and the low voltage and high voltage coils are both located at the silicon steel sheet group of the stator and wherein the low voltage coil of the internal transformer is wound around a first low voltage framework proximal a transverse connecting piece of the silicon steel sheet group and wherein the stator coil is around a second framework distal the transverse connecting piece and further comprising a rectifier filter circuit connected to the low voltage coil such that the low voltage coil of the internal transformer provides AC low voltage to the rectifier filter circuit and the rectifier filter circuit provides low voltage DC power supply to the outside.

7. The submersible pump capable of providing low voltage power supply of claim 6, characterized in that the AC voltage output by the internal transformer is 0.5-30Vac.

8. The submersible pump capable of providing low voltage power supply of claim 6, characterized in that a circuit board is encapsulated in the stator containing cavity of the pump body, and the circuit board is provided with the rectifier filter circuit, or the rectifier filter circuit and a voltage regulator circuit, so as to constitute the DC low voltage power supply.

9. The submersible pump capable of providing low voltage power supply of claim 8, characterized in that the output terminal of the rectifier filter circuit or the voltage regulator circuit of the circuit board is connected to a control circuit, so as to implement controlling the external loads.

10. The submersible pump capable of providing low voltage power supply of claim 8, characterized in that it further comprises a waterproof male female connector assembly, and the waterproof male female connector assembly is connected to the output terminal of the DC low voltage power supply in the submersible pump.

11. A submersible pump capable of providing low voltage power supply comprising:
   a pump body and a filter cover connected to the pump body;
   a stator containing cavity and a rotor containing cavity provided in the pump body, an outside of the rotor containing cavity provided with an impeller room, the upside of the impeller room provided with a water outlet;
   a silicon steel sheet group of a stator and a stator coil encapsulated in the stator containing cavity in the pump body;
   a permanent magnet rotor fixed in the rotor containing cavity in the pump body via a rotor shaft;
   an impeller at one end of the permanent magnet rotor located in the impeller room;
   an internal transformer; wherein the internal transformer is configured to receive a high voltage AC supply and is provided with a low voltage coil, and the stator coil acts as a high voltage coil of the internal transformer, and the low voltage and high voltage coils are both located at the silicon steel sheet group of the stator and wherein the low voltage coil and the stator coil of the internal transformer adopt a same framework, and wherein the low voltage coil and the stator coil are separately wound in low voltage winding grooves and high voltage winding grooves of the framework respectively and further comprising a rectifier filter circuit connected to the low voltage coil such that the low voltage coil of the internal transformer provides AC low voltage to the rectifier filter circuit and the rectifier filter circuit provides low voltage DC power supply to the outside.

12. The submersible pump capable of providing low voltage power supply of claim 11, characterized in that it further comprises a waterproof male female connector assembly, and the waterproof male female connector assembly is connected to the output terminal of the AC low voltage power supply in the submersible pump.

13. The submersible pump capable of providing low voltage power supply of claim 11, characterized in that a circuit board is encapsulated in the stator containing cavity of the pump body, and the circuit board is provided with the rectifier filter circuit, or the rectifier filter circuit and a voltage regulator circuit, so as to constitute the DC low voltage power supply.

* * * * *